United States Patent [19]  
Farmer

[11] Patent Number: 4,894,554  
[45] Date of Patent: Jan. 16, 1990

[54] CABLE SUSPENDED WINDMILL

[75] Inventor: Moses G. Farmer, Hampton, Va.

[73] Assignee: The United States of America as represented by the Administrator of the National Aeronautics and Space Administration, Washington, D.C.

[21] Appl. No.: 246,594

[22] Filed: Sep. 15, 1988

[51] Int. Cl.⁴ ............................................. F03D 9/00
[52] U.S. Cl. ...................................... 290/55; 290/44; 416/9
[58] Field of Search ............... 290/44, 55; 416/9, 194, 416/244 R

[56] References Cited

U.S. PATENT DOCUMENTS

| | | |
|---|---|---|
| 4,073,516 | 2/1978 | Kling ........................................ 290/55 |
| 4,217,501 | 8/1980 | Allison ..................................... 290/55 |
| 4,450,364 | 5/1984 | Benoit ...................................... 290/55 |
| 4,470,563 | 9/1984 | Engelsman ........................ 290/55 X |
| 4,486,669 | 12/1984 | Pugh ......................................... 290/44 |
| 4,491,739 | 1/1985 | Watson .............................. 290/55 X |
| 4,572,962 | 2/1986 | Shepard ................................... 290/55 |

Primary Examiner—William M. Shoop, Jr.  
Assistant Examiner—W. E. Duncanson, Jr.  
Attorney, Agent, or Firm—George F. Helfrich; John R. Manning; Charles E. B. Glenn

[57] ABSTRACT

A windmill includes an airframe having an upwind end and a downwind end, a first rotor rotatably connected to the airframe, and a generator supported by the airframe and driven by the rotor. The airframe is supported vertically in an elevated disposition by poles which extend vertically upwardly from the ground and support cables which extend between the vertical poles. Suspension cables suspend the airframe from the support cable.

21 Claims, 2 Drawing Sheets

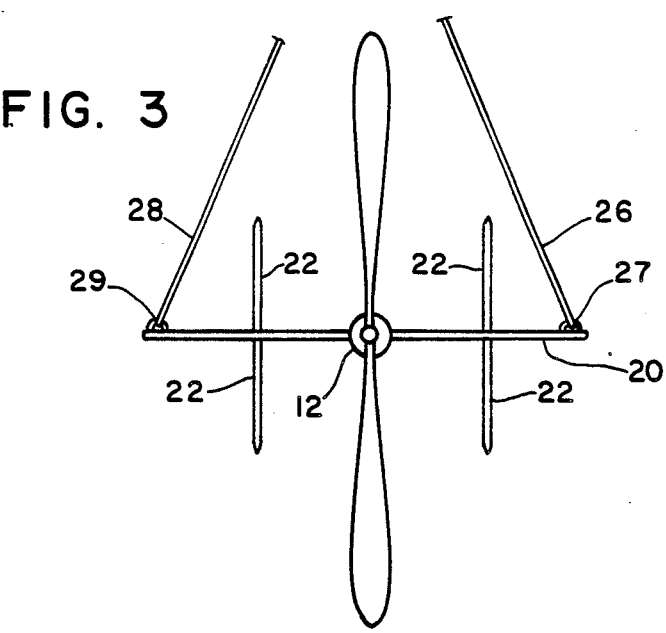
FIG. 3
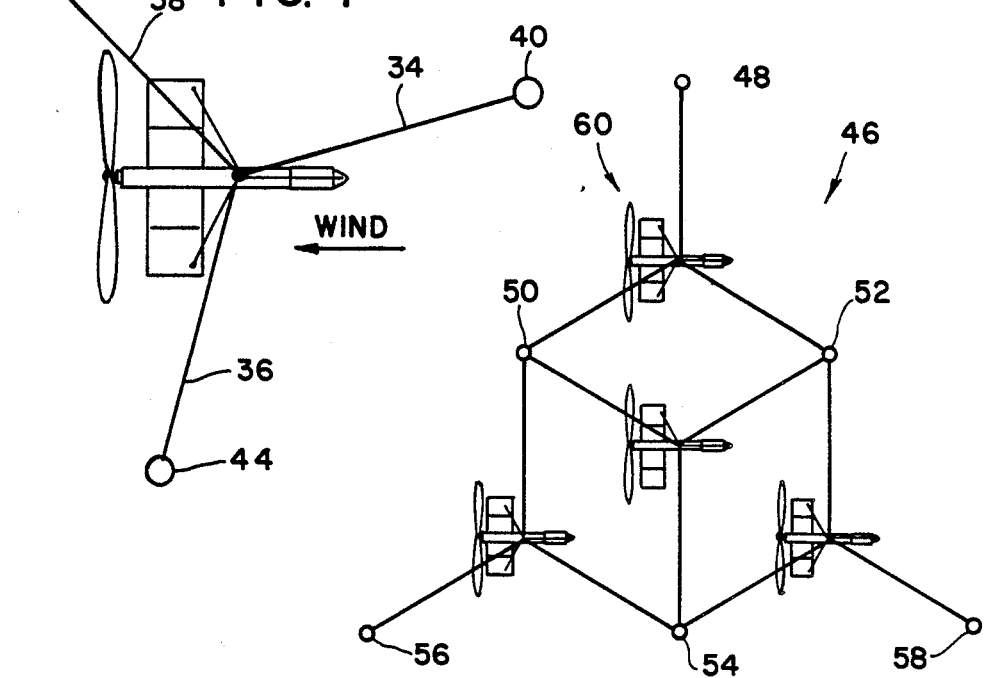
FIG. 4
FIG. 5

CABLE SUSPENDED WINDMILL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to windmills, and more specifically, to windmills suspended from non-rigid support structures.

2. DESCRIPTION OF THE RELATED ART

With ongoing depletion of natural resources, alternative sources of energy need to be developed. While solar and wind power have been explored extensively, problems persist which render both these alternative sources of energy impractical.

One of the problems associated with wind power is that windmills generally require large, permanently installed, rigid support structures or towers to support a rotor at a sufficiently high elevation to place the rotor in a higher velocity air stream. Once installed, a windmill is dependent upon the wind conditions prevalent at its permanent location. Also, rigid support structures are generally complex and expensive to build.

As an alternative to rigid structures, it has been proposed to suspend rotors or "windmills" from balloons which are capable of placing the rotor at much higher elevations. In U.S. Pat. No. 4,073,516, gimble-mounted circular rotors are suspended from a balloon which is tethered to the ground by one or more stays.

U.S. Pat. No. 4,486,669 describes another balloon-suspended windmill which is tethered to the ground. The generators are mounted in a box-like kite enclosure. The rotors of the wind generators or windmills are raised and lowered to achieve maximum electrical output by means of the gas balloon.

U.S. Pat. No. 4,470,563 describes another windmill suspended from a balloon. Instead of producing electric current and feeding the current to the ground by an electrical cable, the rotors simply turn belts which run to the ground and turn a ground-mounted generator.

Balloon-suspended windmills of the type described in the above U.S. patents have numerous drawbacks. For instance, the balloons must be replenished with gas in order to maintain the position of the rotor. Also, the balloons are susceptible to high winds and lightning. Should the balloons suffer a leak, the rotor and generator associated therewith would be destroyed by falling to the ground. Another problem associated with balloon-suspended windmills is that, even with moderate winds, the position of the rotor will be difficult to maintain.

U.S. Pat. No. 4,217,501 describes a windmill mounting system in which twin towers are used to support a plurality of horizontal cables therebetween. A mast has one end connected to one of the horizontal cables and an opposite end connected to an adjacent horizontal cable and is thus disposed in a vertical orientation. A rotor assembly is connected to the mast, which is freely rotatable at its opposite ends.

In the aforementioned U.S. Pat. No. 4,217,501, a true "suspension" is not achieved since the mast is connected at its opposite ends to two horizontal cables. The requirement of a rigid mast reduces the practical uses of the windmill apparatus. The mast described in U.S. Pat. No. 4,217,501 is required to make the rotor assembly statically and dynamically stable.

SUMMARY OF THE INVENTION

An object of the present invention is to provide a statically and dynamically stable windmill apparatus using a flexible support structure.

Another object of the invention is to provide a windmill having an airframe made aerodynamically stable by using aircraft stability and control features.

Another object of the invention is to provide a windmill which rotates in yaw to line itself up with winds from any direction.

In a preferred embodiment of the invention, a windmill apparatus includes an airframe having an upwind end and in a downwind end, a first rotor rotatably connected to the airframe, a generator supported by the airframe and being operatively connected to the rotor, ground based support means for supporting the airframe in a vertically elevated disposition, and suspension means for suspending the airframe from the support means. The airframe includes a fuselage having upwind and downwind ends, a horizontal tail connected to the fuselage and one or more vertical fins extending upwardly and downwardly from the horizontal tail. The ground based support means includes at least two vertical poles having at least one support cable extending therebetween.

Preferably, the suspension means comprises first, second and third suspension cables, each having upper and lower ends, the first suspension cable being connected at the lower end thereof to one of two opposite sides of the horizontal tail, the second suspension cable being connected at the lower end thereof to the other side of the horizontal tail, and a third suspension cable being connected at the lower end thereof to the upwind end of the fuselage, the upper ends of the first, second and third suspension cables being joined at a universal joint which connects the suspension means to the support cable of the support means.

These objects, together with other objects and advantages which will be subsequently apparent reside in the details of construction and operation of the apparatus as more fully hereinafter described and claimed, reference being had to the accompanying drawings forming a part hereof, wherein like reference numerals refer to like parts throughout.

BRIEF DESCRIPTION OF THE DRAWINGS

FIG. 3 is a schematic, rear view of the embodiment of FIG. 1;

FIG. 4 is a schematic, top plan view of the windmill illustrated in FIG. 1, with support structure; and FIG. 5 is a schematic, top plan view of an alterative embodiment of the present invention showing a plurality of windmills with support structure.

DETAILED DESCRIPTION OF THE PREFERRED EMBODIMENTS

Figure 1:
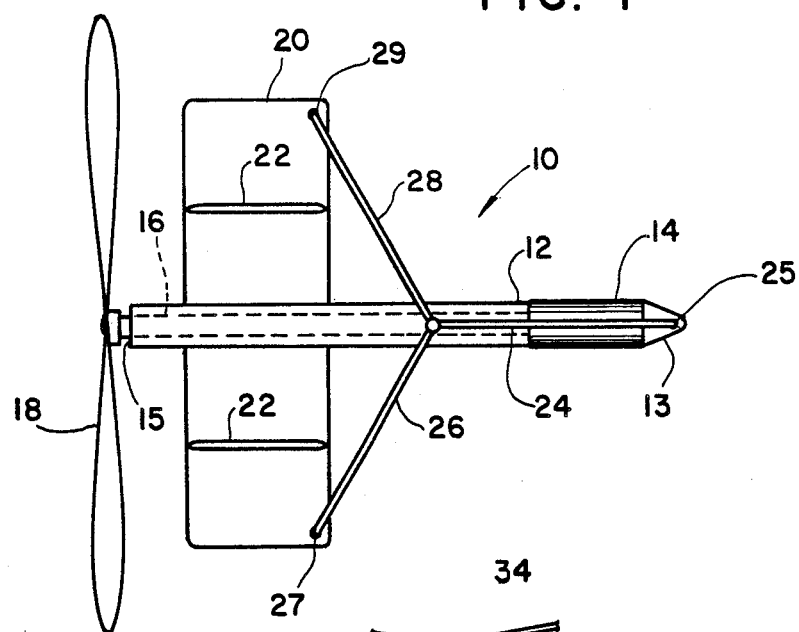
FIG. 1 is a schematic, top plan view of a windmill of a first preferred embodiment of the present invention.
Figure 2:
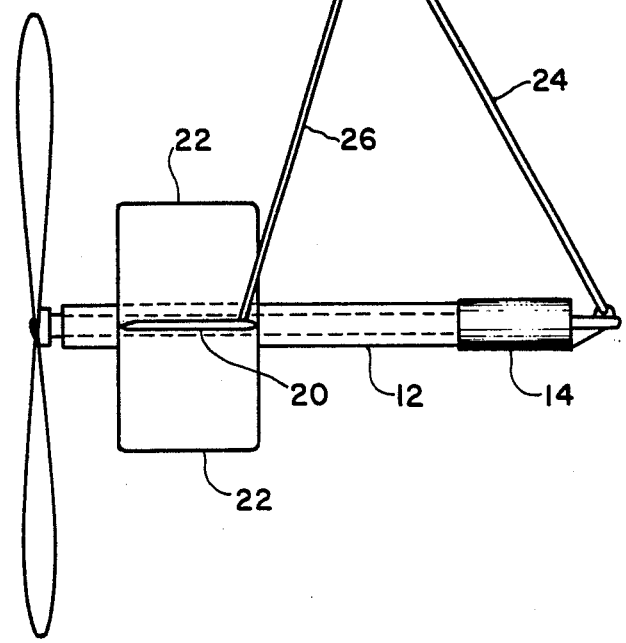
FIG. 2 a schematic, side elevation view of the embodiment of FIG. 1.

Referring to FIGS. 1-3, a windmill is illustrated without its support (which is described later with reference to FIGS. 4 and 5). An airframe 10 includes a fuselage 12 having an upwind end 13 and a downwind end 15. A generator 14 is mounted in the fuselage 12 near the upwind end 13. A drive shaft 16 extends through the fuselage 12 and operatively connects the generator 14 to a rotor 18 disposed at the downwind end 15 of the fuselage 12. Rotation of the rotor 18 drives the generator 14 to produce electric current, which can be delivered to the ground by conventional electrical conduit (not shown). The details of the generator 14, shaft connections, and bearings are conventional and do not form a part of the present invention.

An inherent advantage is achieved by locating the rotor on the downwind end 15 since the rotor will add to the directional stability of the airframe 10. An upwind end-mounted rotor would be possible, although it would require a large vertical tail to achieve directional stability.

The spinning rotor 18 will tend to induce a rolling torque on the airframe 10. While the torque causes tolerable differences in the tension loads on the supporting cables (to be described later), the present invention further contemplates the use of ailerons on the airframe to provide an aerodynamic rolling moment to balance the rotor torque. These ailerons might be fixed in position if the rotor torque is largely a function of wind velocity.

The airframe 10 further includes a horizontal tail 20 connected to the fuselage 12 near the downwind-end thereof and near the rotor 18. Four vertical fins 22 are symmetrically disposed on the upper and lower surfaces of the horizontal tail 20. The airframe 10, which includes the fuselage 12, the horizontal tail 20, and the vertical fins 22, is not required to provide lift, but does provide aerodynamic stability even though the rotor rotates with the wind and is suspended without rigid support.

Suspension cables 24, 26, and 28 have upper and lower ends and are respectively connected to the airframe 10 at points 25, 27, and 29 at their lower ends. The upper ends of the cables 24, 26, and 28 are joined at a universal joint 32. The universal joint 32 connects the suspension cables 24, 26 and 28 to at least one support cable which extends between at least two vertical support posts. Any conventional joint may be used that will facilitate rotation of suspension cables 24, 26, and 28, while support cables 34, 36, and 38 remain stationary.

Referring to FIG. 4, the three support cables 34, 36, and 38 extend from respective vertical support posts 40, 42 and 44. The support cables are connected at their distal ends at the universal joint 32 (see FIG. 2). As previously mentioned, the universal joint 32 can be any joint which allows free rotation of the suspension cables 24, 26 and 28, thus allowing rotation of the airframe 10 suspended from the stationary support cables 34, 36, and 38. While the embodiment shown in FIG. 4 is preferred, it is possible to use only two vertical support posts, such as posts 40 and 42, with a single support cable extending between the two posts. An arrangement of only two vertical support posts would enable a windmill to be suspended over a canyon or similar geographical formation which would provide a natural wind tunnel; this feature would allow a windmill according to the present invention to be suspended at great altitudes.

In the embodiment of FIG. 5, a network 46 of windmills 60 are supported on an array of poles 48, 50, 52, 54, 56 and 58. Once three poles are in place, such as poles 48, 50 and 52, an additional windmill can be installed by simply adding one additional pole such as pole 54. Such an arrangement would require three additional support cables, but only one additional pole, since poles 50 and 52 would serve both sets of support cables.

In the embodiment of FIG. 5, it is further possible to locate the various windmills at different vertical positions so as to reduce the downwind interference effects.

The poles may be supported with guy wires to add strength and stiffness, or may stand alone. In another embodiment, one or more tether cables are attached to the windmill or airframe 10 to prevent the wind from pushing the windmill too far downwind and upwardly. A single cable could be attached to the windmill at its center of gravity from a point on the ground directly underneath. The tether cable is preferably provided with enough slack so that the windmill can swing a few feet downwind in any direction. A tether cable may change the stability characteristics of the machine.

In one embodiment of the invention, the rotor has a diameter of about 14 feet and the fuselage 12 has a length of about 10 feet. The fuselage should have a small cross-section and can be made of any suitable materials, such as aluminum or wood. The horizontal tail 20 may be rectangular as illustrated. The directional stability contribution of the horizontal tail 20 may be enhanced by the use of a sweepback or dihedral configuration. Moreover, the roll damping of the horizontal tail 20 is increased when the horizontal tail 20 has a high aspect ratio. The vertical fins 22 which extend upwardly and downwardly from an upper surface of the horizontal tail 20 contribute to overall stability.

In an alternative embodiment of the present invention, a windmill is provided with more than one rotor. For example, twin, side-by-side, downwind rotors may be provided which rotate in opposite directions, thus enhancing the stability characteristics of the windmill. Alternatively, the windmill is provided with an upwind rotor and a downwind rotor, both coupled by drive shafts to the same generator. In this embodiment, the rotors would turn in the same direction at the same rpm. Opposite end rotors may tend to render the windmill statically and dynamically balanced to alleviate dynamic loads. A four rotor machine may be employed by combining the two aforementioned two-rotor embodiments.

With the combination of suspension and support cables, it is possible to easily raise and lower the windmill so that maintenance can be easily performed and the windmills can be quickly lowered when excessive wind speeds are predicted. Also, since much of the supporting structure consists of tension cables, the structure may be assembled quickly and cost effectively.

The suspension cables provide stability for the windmill by locating the center of suspension well forward of the longitudinal and lateral aerodynamic neutral points. It is desirable to have the center of gravity well forward on the airframe. For this reason, the generator is mounted on the nose of the airframe and thus acts as ballast. Even with the generator placed at the front of the fuselage, it may be desirable to add additional ballast at the front to move the center of gravity further forward.

In the embodiment having a 14 foot rotor, the total weight of the machine is only about 100 pounds. Airframe weight, however, is not a critical factor since the machine is supported by cables and is not supported by aerodynamic lift. Additional weight can be an advantage since it counteracts the tendency of drag forces to push the machine downwind and upwardly.

The amount of energy that is available from the wind is given by the formula $$E = \tfrac{1}{2} pV^3A \text{ (ft. lbs./sec.)},$$

where the p is air density (0.002378 slugs/ft.$^3$ at sea level), V is the wind velocity (ft./sec.), and A is the disk area of the rotor ($\pi D^2/4 = 154$ ft.$^2$ for a 14 foot rotor).

Experience has shown that about 25% of this energy can be converted into electric power (P) if the windmill is operating at the optimum wind velocity for which the rotor has been designed. Thus, $$P \approx \tfrac{1}{8} p V^3 A \text{ ft. lbs./sec.}$$

The power that can be generated at various wind velocities can be estimated, since one kilowatt is equal to 737.6 foot-pounds per second. Power estimates are listed in the following table:

| V ft./sec. | P ft. lbs./sec. | P KW |
|---|---|---|
| 10 | 46. | .06 |
| 20 | 366. | .50 |
| 30 | 1236. | 1.7 |
| 40 | 2930. | 4.0 |
| 50 | 5722. | 7.8 |

In a geographical area where the average wind velocity is at least 20 feet per second, one machine could produce a significant amount of the power required by a typical household.

The many features and advantages of the present invention are apparent from the detailed specification, and thus, it is intended by the appended claims to cover all such features and advantages of the windmill apparatus which fall within the true spirit and scope of the invention. Further, since numerous modifications and changes will readily occur to those skilled in the art based upon the disclosure herein, it is not desired to limit the invention to the exact construction and operation illustrated and described. Accordingly, all suitable modifications and equivalents may be resorted to falling within the scope and the spirit of the invention.

What is claimed is:

1. A windmill apparatus comprising:
   an airframe having an upwind end and a downwind end;
   a first rotor rotatably mounted on the airframe;
   a generator supported by the airframe and being operatively connected to the rotor;
   ground based support means for supporting the airframe in a vertically elevated disposition; and
   suspension means for suspending the airframe from the support means.

2. A windmill apparatus as recited in claim 1, wherein the airframe includes a fuselage having an upwind end and a downwind end, a horizontal tail having opposite sides and being connected to the fuselage, and at least one vertical fin extending upwardly and downwardly from the horizontal tail.

3. A windmill apparatus as recited in claim 1, wherein the first rotor is connected to the downwind end of the airframe.

4. A windmill apparatus as recited in claim 2, wherein the first rotor is connected to the downwind end of the fuselage.

5. A windmill apparatus as recited in claim 4, wherein the horizontal tail is connected to th fuselage next to the first rotor.

6. A windmill apparatus as recited in claim 5, wherein the generator is supported in the fuselage at the upwind end thereof.

7. A windmill apparatus as recited in claim 6, further comprising a drive shaft disposed within the fuselage interconnecting the first rotor and the generator.

8. A windmill apparatus as recited in claim 1, wherein the suspension means includes universal joint means for permitting a wind induced yawing moment to position the fuselage in line with a direction of the wind.

9. A windmill apparatus as recited in claim 8, wherein the airframe includes a fuselage having upwind and downwind ends, a horizontal tail connected to the fuselage and having opposite sides, and at least one vertical fin extending upwardly and downwardly from the horizontal tail.

10. A windmill apparatus as recited in claim 9, wherein the support means comprises at least two ground mounted, substantially vertically oriented poles, and at least one support cable extending between the at least two poles.

11. A windmill apparatus as recited in claim 10, wherein the suspension means comprises first, second, and third suspension cables, each having upper and lower ends, the first suspension cable being connected at the lower end thereof to one of the sides of the horizontal tail, the second suspension cable being connected at the lower end thereof to the other side of the horizontal tail, and the third suspension cable being connected at the lower end thereof to the upwind end of the fuselage, the upper ends of the first, second, and third suspension cables having a common terminus at which the universal joint means connects the suspension means to the support cable of the support means.

12. A windmill apparatus as recited in claim 1, wherein the support means comprises three ground mounted, substantially vertically oriented poles, and three support cables each having proximal and distal ends, the three poles being arranged to form an isosceles triangle, the proximal ends of the three support cables being connected respectively to the at least three poles, and the distal ends of the support cables having a common terminus at a point medial to the isosceles triangles.

13. A windmill apparatus as recited in claim 11, wherein the support means comprises three ground mounted, substantially vertically oriented poles, and three support cables each having proximal and distal ends, the three poles being arranged to form an isosceles triangle, the proximal ends of the three support cables being connected respectively to the at least three poles, and the distal ends of the support cables having a common terminus at the universal joint means.

14. A windmill apparatus as recited in claim 4, further comprising ballast means connectable to the upwind end of the fuselage, for moving the center of gravity of the airframe outwardly away from the rotor.

15. A windmill apparatus as recited in claim 4, further comprising a second rotor mounted at the upwind end of the fuselage and rotating in the same direction as the rotor mounted at the downwind end of the fuselage, and being operatively connected to the generator.

16. A power generating system comprising:
   a plurality of windmills;
   ground based support means for supporting each windmill in a vertically elevated disposition; and suspension means for suspending each windmill from the support means.

17. A power generating system as recited in claim 16, wherein each windmill comprises a fuselage having upwind and downwind ends, a horizontal tail connected to the fuselage and having opposite sides, at least one vertical fin extending upwardly and downwardly from the horizontal tail, a rotor rotatably connected to the downwind end of the fuselage, and a generator supported by the fuselage and being operatively connected to the rotor.

18. A power generating system as recited in claim 17, wherein the suspension means for each windmill comprises first, second, and third suspension cables, each having upper and lower ends, the first suspension cable being connected at the lower end thereof to one of the sides of the horizontal tail, the second suspension cable being connected at the lower end thereof to the other side of the horizontal tail, and the third suspension cable being connected at the lower end thereof to the upwind end of the fuselage, the upper ends of the first, second, and third suspension cables having a common terminus at which the universal joint means connects the suspension means to the support cable of the support means.

19. A power generating system as recited in claim 18, wherein the support means for each windmill comprises at least three ground mounted, substantially vertically oriented poles, and at least three support cables each having proximal and distal ends, the at least three poles being arranged to form an isosceles triangle, the proximal ends of the at least three support cables being connected respectively to the at least three poles, and the distal ends of the at least three support cables having a common terminus at the universal joint means.

20. A power generating system as recited in claim 19, wherein poles of the support means are arranged in an array of isosceles triangles, and wherein X=the number of poles and X−2=the number of support means.

21. A windmill apparatus comprising:
an airframe having an upwind end and a downwind end;
a first rotor rotatably mounted on the airframe;
a generator supported by the airframe and being operatively connected to the rotor; and
suspension means for suspending the airframe in a vertically elevated disposition.

* * * * *